Aug. 1, 1933.  A. RASMUSSEN  1,920,890
STEERING MECHANISM
Filed Oct. 25, 1932
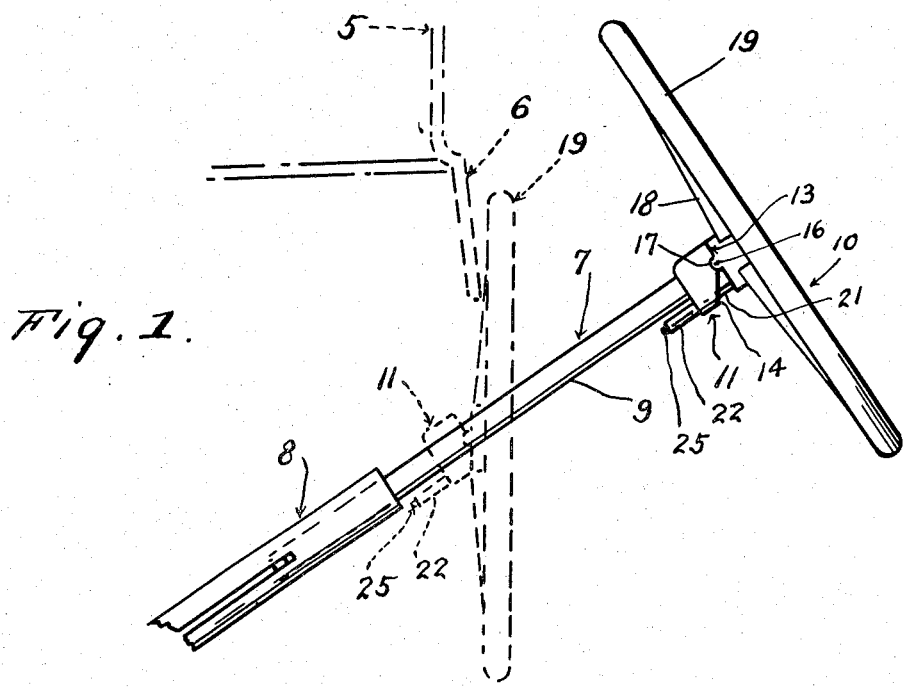
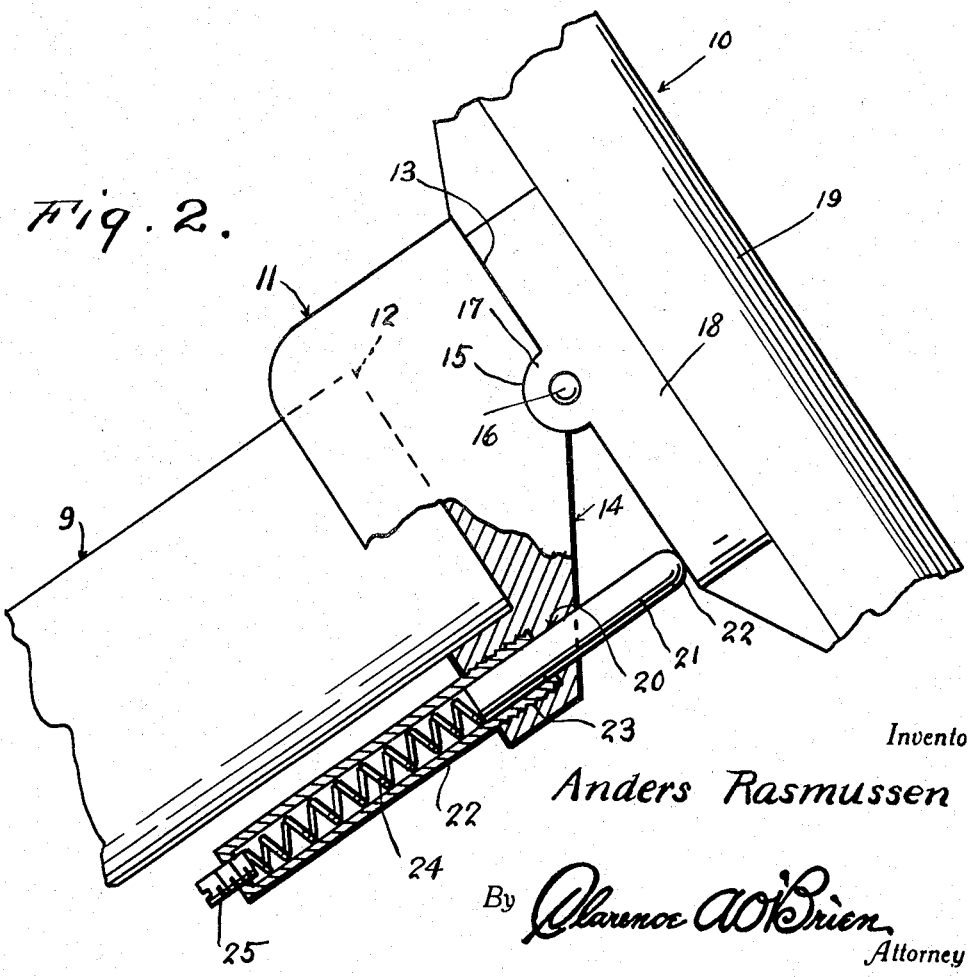
Inventor
Anders Rasmussen
By Clarence A. O'Brien
Attorney Patented Aug. 1, 1933

1,920,890

UNITED STATES PATENT OFFICE 1,920,890

STEERING MECHANISM

Anders Rasmussen, New Albany, Ind.

Application October 25, 1932. Serial No. 639,515

3 Claims. (Cl. 74—80)

My invention relates generally to steering mechanism for motor vehicles, aircraft, boats and the like, and particularly to a telescoping and collapsible steering mechanism which is adapted to telescope and collapse out of the way under certain circumstances so as to avoid injury and inconvenience to the operator thereof.

It is an important object of my invention to provide a structurally efficient telescoping and collapsible steering wheel structure, wherein the steering post is telescopable into the steering column, and wherein the wheel itself is capable of assuming a position different from that normal to it, when sufficient pressure is exerted against the steering wheel, so as to enable an operator to place the steering post and the steering wheel in an out of the way position upon the approach of an emergency such as a collision, which arrangement provides also that the steering wheel and steering post shall move into the out of the way position upon an involuntary imposition of sufficient pressure thereon by the operator as a result of a collision or the like accident.

It is also an important object of my invention to provide a structure of the class described, which is unusually simple and efficient, and which can be constructed adequately ruggedly so as to meet recognized standards of efficiency and strength.

Other objects and advantages of my invention will be apparent from a reading of the following description in connection with the drawing, wherein for purposes of illustration I have shown a preferred embodiment of the invention.

In the drawing:—

Figure 1 is a general side elevational view of the device of the invention showing it in its normal disposition, and in dotted lines showing the displaced condition thereof.

Figure 2 is an enlarged elevational view of a portion of the device as shown in Figure 1, partly in section to show details of structure and assembly.

Referring in detail to the drawing, wherein like numerals refer to like parts throughout the same, the numeral 5 designates generally the forward part of a motor vehicle or the like, such as a windshield and instrument panel or dashboard 6, in conjunction with which is shown the device of the invention which is generally designated 7.

The device of the invention comprises the steering column 8, in which is mounted telescopically in a manner set out in Letters Patent 1,791,001, filed January 30, 1929, granted to me on the 3rd day of February, 1931. The steering post is herein designated generally by the numeral 9 and it has mounted upon its upper end the steering wheel structure generally designated 10. The steering wheel structure comprises a suitable heavy block 11 which has in its underside a socket formation 12 in which is received the upper end of the steering post 9. The steering post 9 may be suitably keyed or otherwise securely mounted in the socket so that there will be permitted no relative rotation of the wheel structure 10 with the steering post 9. The block 11 is provided with a right angular plane upper surface 13 which occupies aproximately one-half of one side of the block. An angularly related portion 14, approximately occupying the other half of the upper part of the block 11 is located and disposed as shown in the drawing. Intermediate the surfaces 13, 14 the block is provided with a transverse semi-circular groove 15 in which are located lugs or some other suitable form of hinge means for receiving the hinge pin 16 connected to the projecting portion 17 on the underside of the web 18 of the steering wheel 19, whereby one portion of the steering wheel web 18 may rest upon the right angular face 13 of the block 11 when the steering wheel is in the normal position, and another portion of the steering web 18 may rest against the angularly related face 14 of the block 11 when the steering wheel is in the collapsed or out of the way disposition. This out of the way position is illustrated in dotted lines in Figure 1, wherein the steering wheel is shown collapsed against the instrument panel 6 in a vertical position, conditioned by the vertical disposition of the angularly related surface 14 on the steering post head. It will be observed that in case of pressure forwardly against the wheel when in the dotted line position shown in Figure 1, it will be supported against tilting by the instrument panel 6 and by the angularly related surface 14, and will not present any approximately horizontal projections or portions which would endanger an operator in the event of a collision or other accident to the vehicle or the like. In order to achieve the position shown in dotted lines in Figure 1, it is necessary that the steering post 9 telescope into the steering column 8 in the manner set forth in the Letters Patent mentioned.

In order that the steering wheel may be sufficiently supported in normal position to enable the ordinary functions of a steering wheel to be exercised, I provide in the under part of the block a passage 20 in which is slidably mounted a plunger 21 which has a rounded nose 22 engageable with the underside of the web 18 of the steering wheel. The plunger 21 is slidable also in a tubular member 22 which is threaded as indicated at 23 into a recess of greater interior diameter than the passage 20. Within the tubular member 22 is an expanding spring 24 which is kept under adjusted tension by means of an adjusting screw 25 threaded into the lower end of the tubular member 22. The strength of the spring 24 is sufficient to maintain the steering wheel in its normal position during ordinary use thereof.

Though I have shown and described herein a preferred embodiment of the invention, it is to be definitely understood that I do not desire to limit the application of the invention thereto, and any change or changes may be made in material and structure and arrangement of parts, within the spirit of the invention and the scope of the subjoined claims.

What is claimed is:—

1. In a structure of the character described, a steering column, a mounting element on the upper end of the steering column, a second mounting element hinged to the first mounting element, a steering wheel fixed on the second mounting element, the steering wheel being arranged to be tilted relative to the steering column into a vertical position, a spring pressed member slidable axially in the first mounting element and engaged with a side portion of the second mounting element for yieldably maintaining the steering wheel in normal position.

2. In a structure of the character described, a steering column, a mounting element on the upper end of the steering column, a second mounting element hinged to the first mounting element, a steering wheel fixed on the second mounting element, the steering wheel being arranged to be tilted relative to the steering column into a vertical position, spring means carried by the first mounting element and engaged with a side portion of the second mounting element for maintaining the steering wheel normally out of vertical position, said first mounting element having a lateral extension carrying said spring means.

3. In a structure of the character described, a steering column, a mounting element on the upper end of the steering column, a second mounting element hinged to the first mounting element, a steering wheel fixed on the second mounting element, the steering wheel being arranged to be tilted relative to the steering column into a vertical position, spring means carried by one side of the first mounting element and engaging with a side portion of the second mounting element for maintaining the steering wheel normally out of said vertical position, said spring means having a portion slidably engaging the second mounting means.

ANDERS RASMUSSEN.